Oct. 15, 1957 E. ORSHANSKY, JR 2,809,594
FLUID PRESSURE MECHANISM
Filed May 11, 1953 3 Sheets-Sheet 3
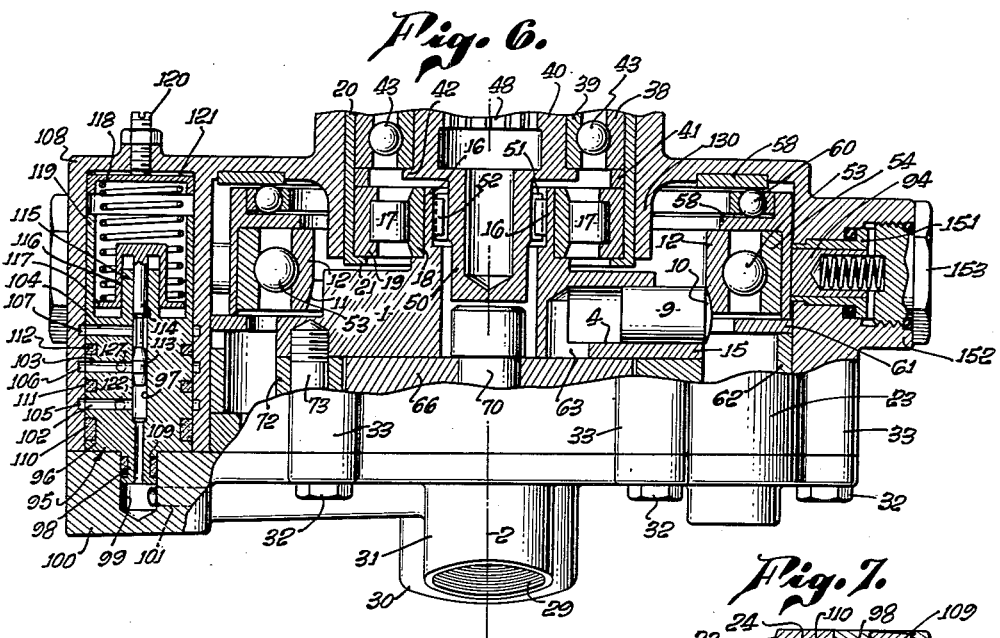
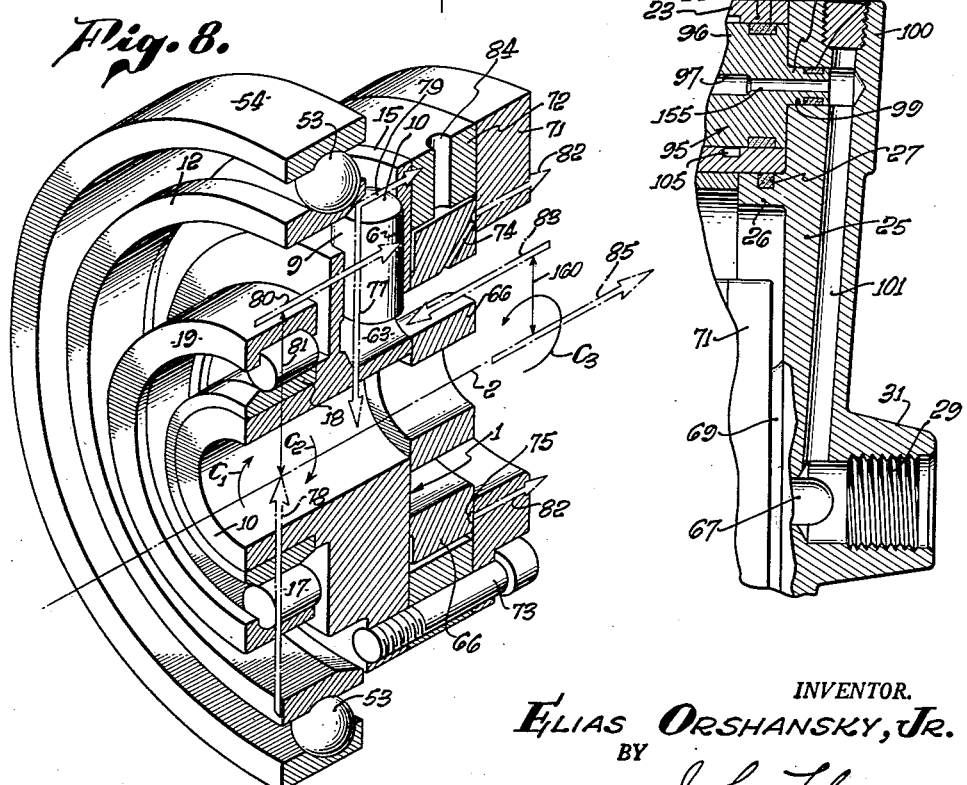
INVENTOR.
ELIAS ORSHANSKY, JR.
BY
John Flam
ATTORNEY.

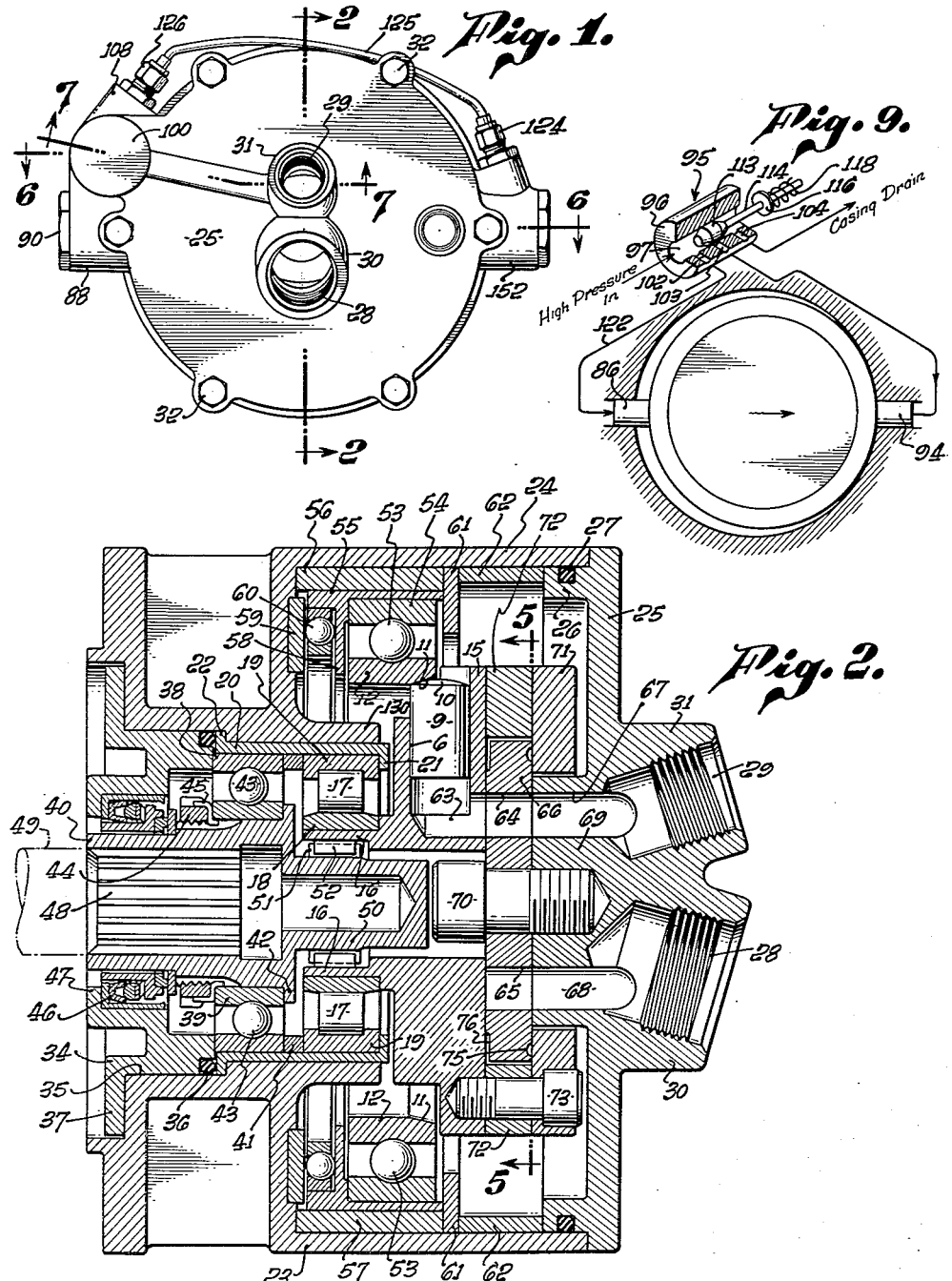
Oct. 15, 1957    E. ORSHANSKY, JR    2,809,594
FLUID PRESSURE MECHANISM
Filed May 11, 1953    3 Sheets-Sheet 1
INVENTOR.
ELIAS ORSHANSKY, JR.
BY John Flam
ATTORNEY.

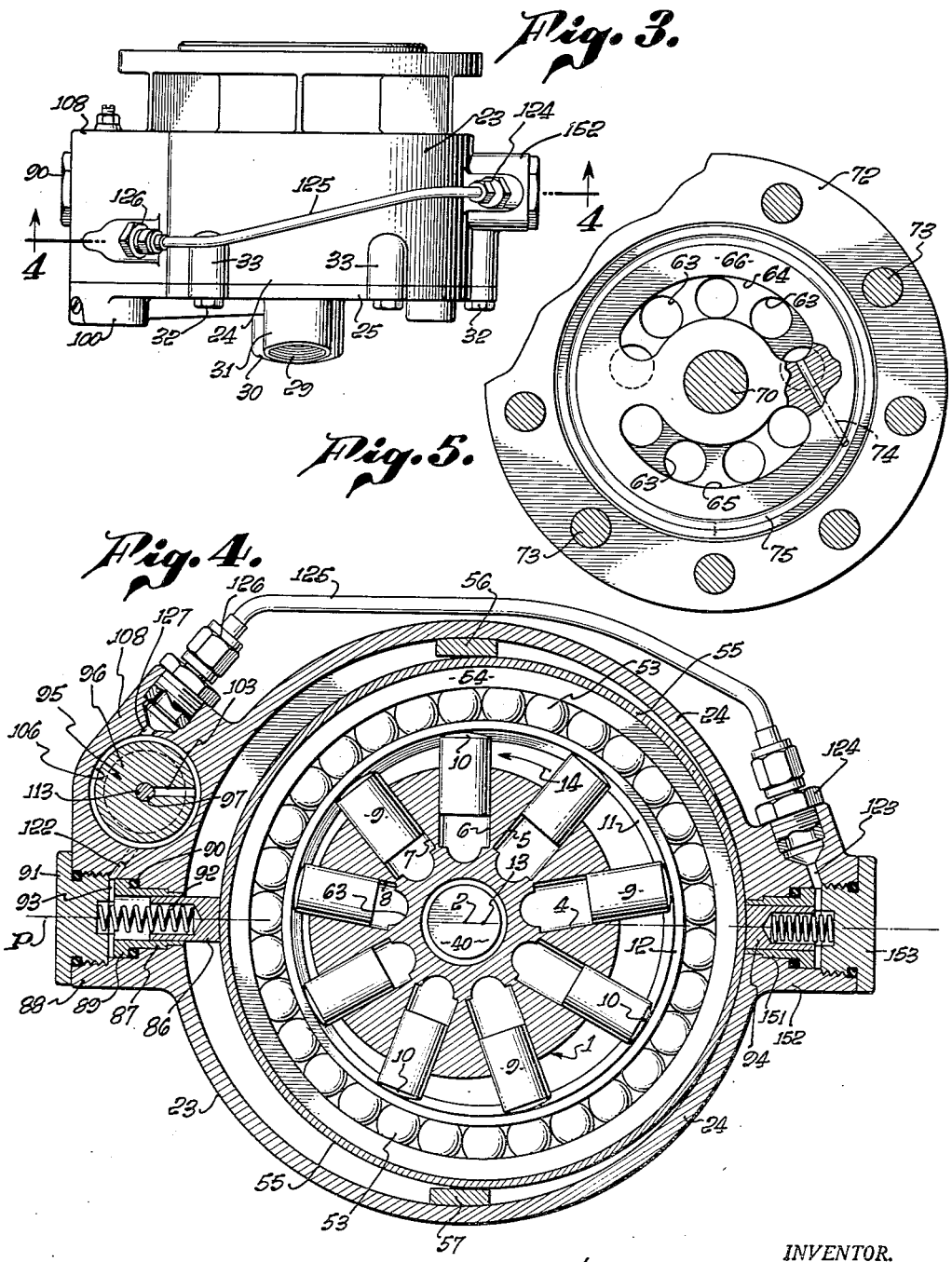

United States Patent Office 2,809,594
Patented Oct. 15, 1957

2,809,594

FLUID PRESSURE MECHANISM

Elias Orshansky, Jr., Pasadena, Calif., assignor, by mesne assignments, to The New York Air Brake Company, New York, N. Y., a corporation of New Jersey Application May 11, 1953, Serial No. 354,018

8 Claims. (Cl. 103—161)

This invention relates to apparatus adapted to operate either as a fluid pump or as a fluid motor. More particularly it relates to a structure adapted to operate under high liquid pressures of the order of several thousand pounds per square inch.

Pumps capable of producing such high pressures are now commonly used on aircraft for providing the hydraulic pressures to operate numerous controls, etc., for the aircraft. Difficulties are encountered in providing a simple, compact, and efficient pump suitable for these purposes.

It is one of the objects of this invention to provide a high pressure pump that effectively complies with all of these requirements; however, embodiments of the invention may of course be utilized for other purposes.

Pumps for producing such high pressures may utilize a rotary cylinder block, having radial cylinder bores, equiangularly spaced around the axis of rotation of the block. Pistons operate in the bores. The reciprocation of the pistons is effected by the aid of an eccentric reaction ring, having an internal surface against which the outer ends of the pistons bear. Let it be assumed that a plane passes through the axis of the cylinder block and the axis of the eccentric ring. Then all of the pistons on one side of the plane are moving outwardly of the bores (corresponding to intake of fluid), and all those on the other side of the plane are moving inwardly (corresponding to the pressure stroke). Provisions for connecting the bores first to the inlet and then to the outlet of the pump, are effected in the usual manner, as by a non-rotary valve plate.

When high hydraulic pressures are produced by the pump, stresses on the cylinder block, bearings, etc., are created; and these in turn inevitably result in excess wear, leakage, and loss of efficiency. In the past various suggestions have been made either to reduce these strains or to compensate for them. Such suggestions lead to cumbersome and expensive structures.

It is another object of this invention to make it possible to reduce the effect of the high stresses well within a tolerable range, and by utilizing a simple and inexpensive construction.

Much of the undesirable strains and deflections are due to the cocking action of the cylinder block about an axis transverse to the axis of rotation of the cylinder block. It is still another object of this invention very greatly to reduce the torque tending to produce this cocking action, in a very simple and effective manner.

It is still another object of this invention to provide a mechanism for automatically adjusting the eccentricity of the reaction ring in response to variations in the output pressures. Accordingly, such output pressures can be closely maintained in spite of fluctuating load demands.

This invention possesses many other advantages, and has other objects which may be made more clearly apparent from a consideration of one embodiment of the invention. For this purpose, there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings:

Figure 1 is an end elevation of a mechanism incorporating the invention;

Fig. 2 is an enlarged longitudinal sectional view, taken along a plane corresponding to line 2—2 of Fig. 1;

Fig. 3 is a plan view of the mechanism;

Fig. 4 is a sectional view taken along a plane corresponding substantially to line 4—4 of Fig. 3;

Fig. 5 is a sectional view taken along a plane corresponding to line 5—5 of Fig. 2;

Fig. 6 is a sectional view taken along a plane corresponding to line 6—6 of Fig. 1;

Fig. 7 is a fragmentary sectional view taken along a plane corresponding to line 7—7 of Fig. 1;

Fig. 8 is an isometric diagrammatic sectional view, indicating the forces acting upon the pump cylinder block; and Fig. 9 is a diagram illustrating the manner in which the degree of eccentricity of the reaction ring may be controlled.

The pump structure includes a rotary cylinder block 1, shown to best advantage in Fig. 4. This cylinder block 1 is mounted for rotation about an axis 2 (see also Fig. 8).

In the present instance nine radially arranged cylinder bores are provided in the cylinder block 1. These cylinder bores are equiangularly spaced around the axis 2. Five of them, designated by reference characters 4, 5, 6, 7 and 8, are shown in Fig. 4 above the horizontal plane P passing through axis 2. Four others are disposed below this plane.

In each of these nine cylinder bores a piston structure 9 is radially movable. The outer end of each of these piston structures is provided with a convex surface 10 arranged to cooperate with the sloping or conical surface 11 of an eccentric reaction ring 12. The center 13 of this reaction ring is indicated in Fig. 4 and is shown as disposed toward the right of the axis 2 and in the plane P. Accordingly, as the rotary cylinder block 1 revolves in a counterclockwise direction, as indicated by the arrow 14 of Fig. 4, each piston structure 9 is urged radially inwardly while the piston is given an angular movement of 180° about axis 2 and above the plane P. In a pumping structure, therefore, this corresponds to the pumping stroke.

In the next half revolution, below the plane P, each piston structure 9 is caused to move outwardly of the respective cylinder chambers; and therefore this angular movement corresponds to the intake stroke. In order, therefore, that the mechanism be operated as a pump, the outlet passage way is connected to those cylinder spaces which are located above the plane P, and the inlet to the cylinder spaces is connected to those which extend below the plane P, as viewed in Fig. 4.

The walls forming the cylinder spaces 4, 5, 6, etc., are each provided with a semi-circular extension 15 (Figs. 2, 6 and 8) projecting radially of the axis 2. Each semi-circular extension 15 has its concave side facing the reaction ring 12. Thus it provides a long guiding surface for the piston 9, well able to sustain the reaction of the side thrust imposed on the piston by the reaction ring 12. Accordingly the tendency to distort the cylinder bores into an elliptic form is substantially prevented.

The cylinder block 1 is provided with a hub portion 16 (Figs. 2, 6 and 8) extending toward the left. This hub portion is rotatably supported by a bearing structure, including the rollers 17 disposed between an inner race 18 attached to the hub 16, and an outer race 19. This outer race 19 is in turn supported within a sleeve 20. This sleeve is supported in a hub 130 projecting inwardly of the left-hand wall of the pump casing 23. This sleeve has a right-hand flange 21 limiting movement of the race 19 toward the right as viewed in Fig. 2. The left-hand end of the sleeve 20 is provided with an external flange 22 resting on a shoulder formed in the pump casing 23. This pump casing 23, in conjunction with its flange 24, and a cover member 25, forms a substantially complete enclosure for the pump parts.

As shown most clearly in Fig. 2, the cover member 25 is provided with a flange 26 telescoping within the flange 24. An O-ring 27 is disposed in an annular groove in the flange 26 to provide a fluid-tight connection between the flange 24 and the cover 25.

The cover 25 is provided with the inlet opening 28 and an outlet opening 29 formed in the bosses 30 and 31 respectively. These bosses are integral with the cover member 25 and are provided with internal threads for appropriate connection to conduits. The cover member 25 may be appropriately bolted to the casing member 23 as by the aid of the cap screws 32 (Figs. 1, 3 and 6). These cap screws engage threaded apertures within the bosses 33 formed exteriorly of the casing member 23.

The sleeve 20 that accommodates the outer race 19 of the main bearing support for the cylinder block 1 is held against its seating shoulder by the aid of a supplemental cover member 34 (Fig. 2). This cover member 34 telescopes tightly within the bore 35 formed in the casing 23. It has a reduced right-hand portion for the accommodation of the O-ring 36 sealing against the flange 22.

The cover member 34 is also provided with a radially extending flange 37 by the aid of which it may be bolted to the casing 23.

The right-hand surface of this cover member abuts the outer race 38 of a ball bearing structure that rotatably supports a driving shaft for the cylinder block. This ball bearing structure includes the inner race 39 mounted upon the drive shaft structure 40 rotatable about the axis 2. The outer race 38 is located within the sleeve 20. It is held in spaced relation with respect to the outer race 19 by the aid of a spacer ring 41.

The inner race 39 abuts a flange 42 formed on the shaft 40. A plurality of rolling elements, such as the balls 43, are interposed between the inner race 39 and the outer race 38.

The inner race 39 is clamped against flange 42 by the aid of a nut 44 threaded on the shaft 40 and locked against removal as by the locking ring member 45. The inner edge of this ring or washer projects underneath the race 39, which overhangs a reduced portion of shaft 40. It is also provided with locking extensions at the outer edge projecting into slots formed in the outer periphery of the locking nut 44.

A conventional seal structure 46 may be interposed between the inwardly directed flange 47 of cover member 34 and the shaft 40.

The shaft 40 is hollow and provided with internal splines 48 for making it possible to couple this shaft to a source of power such as a driving shaft 49.

The shaft 40 is furthermore provided at its right-hand end with a reduced hollow extension 50. The outer periphery of this reduced extension carries a number of splines 51 adapted to interengage corresponding splines 52 located within the hub structure 16 of cylinder block 1. Accordingly the shaft 40 is placed in driving relation to the cylinder block 1.

The reaction ring 12 with which the pistons 9 cooperate is rotatably mounted by the aid of a plurality of balls 53 (see also Figs. 4, 6 and 8). These balls 53 are disposed between the reaction ring 12 and an outer race 54. This outer race 54 is seated within a ring 55. This ring in turn is mounted for sliding movement between the guides 56 and 57 (see particularly Fig. 4) attached to the inner periphery on the casing 24. This sliding movement is in a direction parallel with the plane P, for adjusting the eccentricity of the reaction ring 12. Accordingly the pump displacement can be adjusted. The particular manner in which this is effected will be described hereinafter.

The ring 55 which carries the outer race 54 is provided with an inwardly directed flange 58. This flange is opposed to a ring insert 59 serving as a wear plate and accommodated in a wall of the casing 23. The wear plate can be made of appropriate material, such as steel.

Interposed between the flange 58 and the wear plate 59 is a thrust ball bearing structure 60. This ball bearing structure in cooperation with the flange 58 and plate 59 limits the movement of the eccentric ring to the left, as viewed in Fig. 2. Movement to the right is limited by a spacer ring 61 and a sleeve 62.

This ball bearing structure facilitates the linear adjustment of the reaction ring between the guides 56 and 57.

Each and every one of the cylinder bores 4, 5, 6, etc., is provided with a port 63 at its inner end. All these ports extend toward the right, as viewed in Fig. 2, and open at the right-hand surface of the block 1. These ports cooperate with either one or the other of the kidney ports 64 and 65 located in a valve plate 66 (see Fig. 5). The kidney port 64, being above plane P, communicates with those cylinder spaces that are in the discharging position. Therefore this kidney port is in communication with a corresponding port 67 in cover 25, leading to the outlet 29 (Fig. 2). The kidney port 65 similarly cooperates with a port 68 in cover 25 leading to the inlet opening 28.

The valve plate 66 is attached to the central boss 69 of the cover member 25 by the aid of a central screw 70.

The kidney port 65 extending below the plane P thus leads the liquid to be pumped to those cylinders which are at any instant below this plane P. The kidney port 64 similarly conducts the liquid from the cylinder spaces above plane P to the outlet port 29.

The left-hand face of valve plate 66, as viewed in Fig. 2, is opposed to the right-hand face of the cylinder block 1. These two elements are held in proper cooperative relation by the aid of a ring 71 disposed on the right-hand side of the valve plate 66 and spaced from the cylinder block 1 by the aid of a spacer ring 72. The spacer ring 72 may be a fraction of a thousandth of an inch wider than the valve plate 66 and accordingly there is a sufficient running fit between the outer edge of the valve plate 66 and the contiguous walls of the block 1 and ring 71.

The spacer ring 72 and the end ring 71 are joined to the cylinder block 1 by the aid of a plurality of screws 73. These screws are of sufficient size and number so as to reduce to an inappreciable value any tensile strain that may be placed upon these screws by the pressure of the fluid in the space defined by the ring 71 and block 1. Accordingly the spacing between the ring 71 and the cylinder block 1 is maintained substantially constant, in spite of the existence of high pressures in the mechanism.

There is a slight radial clearance between the outer peripheral edge of the valve plate 66 and the inner periphery of the ring 72. This makes it possible for the cylinder block 1 to adjust its axis of rotation as determined by the roller bearing structure 17. This adjustment is facilitated because there is but one such bearing structure required for supporting the cylinder block. Adequate guiding support for the block is effected by cooperation of the adjacent faces between the cylinder block 1 and the valve plate 66.

Since the kidney port 64 is subjected to high outlet pressure, this pressure is effective between the adjacent surfaces of the cylinder block 1 and the plate 66 to tend to urge them apart. The area over which the pressure is effective corresponds to about a half-circle above the plane P. A port 74 (Figs. 5 and 8) passing through plate 66 serves to conduct high pressure liquid to the space between the ring 71 and the right-hand surface of the valve plate 66. This port 74 leads to a shallow annular groove 75 in the right-hand face of the plate 66. The area over which this pressure is effective corresponds to a substantially annular band where the plate 66 and ring 71 are opposed to each other.

The left-hand face of the valve plate 66 has a recessed portion 76. In this way the opposed areas of the cylinder block 1 and the valve plate 66 are confined to a relatively narrow annular band, the width of the band being chosen to effect proper results as hereinafter explained. One or more drains 84 (Fig. 8) extend radially through the spacer ring 72, for reducing the pressure in the space at the periphery of the plate 66 and the recess 76.

Reference may now be made to Fig. 8 illustrating the forces acting upon the cylinder block 1 to tilt or cock it about an axis normal to axis 2.

There are forces directed radially inwardly upon the cylinder block through the pistons 9 and corresponding to the radial components of the reaction between the piston surface 10 and the reaction ring surface 11. These components subject the cylinder block 1 to forces created by the pressure in the cylinder bores. The summation of these radially inwardly directed forces is represented by the arrow 77 in Fig. 8. The length of this arrow is a measure of this integrated force.

Another radially inwardly directed arrow 78 corresponds to the summation of the bearing reaction forces. These bearing reactions are effective through the rollers 17 and their sum equals the force 77.

These two arrows are spaced apart in a direction along the axis of rotation 2, thus setting up a torque couple. This torque couple is about an axis normal to the axis 2 and may be represented by the arrow $C_1$.

By reason of the sloping surface 11, there are components 79 of the reaction forces acting upon the pistons 9, that are parallel to the axis 2. The summation of these forces is represented by the arrow 80, spaced from axis 2 by a distance corresponding to the length of arrow 81. The reaction forces 79 being greater on the outlet side of plane P, this force 80 is above that plane. This force 80 creates a torque $C_2$ in the same direction as torque $C_1$. It is the sum of these two torques that must be neutralized in order to prevent the undesirable cocking of the cylinder block 1.

The summation of the forces acting on block 1 due to the high pressure fluid between the contiguous faces of block 1 and valve plate 66 is represented by arrow 83, spaced above plane P by a distance 160.

Similarly, there are forces 82 effective on ring 71 and therefore on block 1. These forces are arranged symmetrically around and parallel to axis 2, and correspond to the pressure exerted by the fluid around that annular surface of ring 71 which is opposed to plate 66. The arrow 85 corresponds to the summation of the forces 82, and lies on axis 2.

The forces 83 and 85 set up a torque $C_3$ equal and opposite to the sum of the two torques $C_1$ and $C_2$.

This equality is attained by the proper choice of the opposed surfaces between the valve plate 66 and the cylinder block 1, as well as between the valve plate 66 and the ring 71.

The reaction ring structure, as heretofore explained, is slidable between the guides 56 and 57 (Fig. 4). The eccentricity corresponding to the spacing between the axes 2 and 13 is thus capable of adjustment. This causes a corresponding adjustment of the pump displacement. In Fig. 4, the maximum eccentricity is indicated, corresponding to maximum pump displacement.

Adjustment of the eccentricity is automatically effected in response to variations in pressure at the outlet passage 29. Thus, for example, when the outlet pressure increases, the displacement is reduced by a reduction of the eccentricity, the reaction ring being moved to the left, as viewed in Fig. 4. Similarly when the pressure at the outlet decreases, the eccentricity is increased by movement of the reaction ring structure to the right.

For this purpose, control forces are provided at diametrically opposite sides of the reaction ring structure, and in opposed relation. The relative values of these forces determine the equilibrium position of the reaction ring structure 12. Thus, at the left-hand side, as viewed in Figs. 4 and 9, a hollow control piston 86 is slidable radially with respect to axes 2 and 13, and within a guide bushing 87. This piston is caused to exert a radial force urging the reaction ring 12 toward increasing eccentricity. The bushing 87 forms a cylinder bore in which piston 86 operates.

Guide bushing 87 is held firmly in a boss 88 of the casing 23. This bushing has a flange 89 seated against an O-ring 90. This O-ring 90 is disposed on a shoulder located around the bore in the boss 88 which accommodates the bushing 87. A screw 91 threaded into the boss 88 holds the guide bushing 87 in place. A compression spring 92 within piston 86 urges it toward the right. An additional force is exerted on the piston 86 by the high pressure liquid which can enter into the hollow guide bushing 87 by way of radial slots 93 formed in the inner end of the screw 91. The manner in which high pressure is led into the guide bushing 87 will be described hereinafter.

A similar control piston 94 is located on the right-hand side of the reaction ring structure (Fig. 9). The force exerted by this piston 94 is opposed to that of piston 86, and urges the reaction ring structure 12 toward the left to reduce the eccentricity. The manner of guiding the piston 94 is quite similar to that illustrated in connection with the piston 86. Thus there is a guide bushing 151 in boss 152 of casing 23, which forms a cylinder space for piston 94. A sealing screw 153 similarly holds the bushing 151 in place.

Piston 94 is somewhat larger in diameter than the piston 86. Accordingly when subjected to equal hydraulic pressures, the piston 94, having a larger area will exert a greater force upon the reaction ring structure toward the left than that exerted by the piston 86 for moving the reaction ring structure toward the right.

In order to lead fluid under pressure to the interior of the guide bushings 87 and 151, as required for the adjusting movement of the reaction rings, a valve structure 95 is used. This valve structure 95 is shown diagrammatically in Fig. 9. It includes a barrel 96 (Figs. 4, 6 and 7) which has a central bore 97. This barrel at one end has a reduced portion 98. This portion 98 fits into a bore 99 located in a boss 100 formed integrally with the cover 25. The inner end of the bore is in communication with a high pressure fluid passageway or port 101 leading to the high pressure outlet 29, as shown most clearly in Figs. 6 and 7.

The barrel 96 is provided with a plurality of axially spaced radial ports 102, 103 and 104. These ports lead respectively to the annular grooves 105, 106 and 107 disposed in the inner wall of a valve housing member 108 (see also Fig. 3) that is formed integrally with the casing 23. Packing rings 109, 110, 111 and 112 (Fig. 6) are placed between ports 102, 103 and 104, as well as at the end of barrel 96 and around the extension 98. These rings ensure that no material leaks can occur between the annular spaces 105, 106 and 107, nor from the port 101 to these annular spaces. These rings are disposed in annular grooves on the barrel 96.

The central bore 97 of the barrel 96 is in communication with the high pressure passageway 101 by the aid of the port 155. A movable valve closure 113 subjected to the high pressure passing through the port 155 determines whether annular groove 106 is supplied with high pressure fluid through radial port 103. When the port 103 is closed, then, as hereinafter explained, no fluid pressure is available for urging piston 94 to the left.

The valve closure member 113, slidable in the bore 97 controls the port 103. It has a cylindrical surface capable of closing off communication between the bore 97 and this radial port. This closure member 113 is mounted on a stem 114 that is guided in the boss 115 formed integrally with the barrel 96. Stem 114 may be integrally joined to the inside of a flanged cup member 116 which telescopes over the boss 115. The flange 117 of this cup member serves as a seat for compression spring 118 located in the hollow extension 119 of the barrel 96.

The spring 118 urges the closure member 113 in one direction; that is, toward the left, as viewed in Fig. 9. The liquid under high pressure in the bore 97, however, urges the closure member 113 in the opposite direction. When there is a balance between these two forces the closure member 113 is at rest.

The force of the spring 118 can be adjusted by the aid of a screw 120 engaging a spring anchor member 121. This screw is threaded in the end wall of the housing 108.

The annular passageway 105 in this housing is in constant communication with the high pressure by way of the radial port 102 and the bore 97 (Fig. 6). This annular passageway communicates with a port 122 leading to the interior of the guide bushing 87 (Fig. 4). Thus the outlet pressure is utilized to urge the smaller piston 86 constantly toward the right as viewed in Fig. 4.

The larger piston 94 is urged toward the left by high fluid pressure only when the valve member 113 is urged to open port 103 by the pressure in bore 97. For this purpose a port 123 (Fig. 4) is provided leading to a pipe coupling 124 and a conduit 125. This conduit 125 communicates by way of a pipe coupling 126 and a port 127 with the annular groove 106. This groove 106, when port 103 is uncovered by closure 113, thus supplies piston 94 with high pressure fluid.

In the position of Fig. 6, communication is shut off between the piston 94 and the high pressure of the liquid because the closure 113 closes the inner end of the port 103.

Under such circumstances the high pressure effective to urge the smaller piston 86 to the right, as viewed in Fig. 4, is counterbalanced only by the force of spring 127 in the piston 94. Movement of the eccentric reaction ring structure 12 to the right continues until an equilibrium is established.

Should the liquid pressure be increased, the closure 113 is urged to opening position against the force of the spring 118. This uncovers port 103, and high pressure fluid is available through annular grooves 106, port 127, through conduit 125, and port 123 to urge the control piston 94 toward the left. Since the force exerted by piston 94 is larger than that exerted by piston 86 (because of its larger area), the movement continues toward the left until the force of spring 92 added to the force of piston 86, balances the force of piston 94. Accordingly an equilibrium position is established, corresponding to the outlet pressure. The greater the pressure, the less the pump displacement, because the eccentricity is reduced. A reduction in pressure of course causes the piston 86 to move slightly to the right to increase the displacement. A new equilibrium point is thus established.

Upon further reduction of pressure, the closure 113 may close port 103 completely. In such case, the reaction ring 12 is moved to substantially maximum eccentric position.

Annular groove 107 is connected to a drain to the interior of casing 23. It serves therefore to eliminate any substantial fluid pressure that may urge the valve closure 113 toward closed position.

The inventor claims:

1. In hydrodynamic apparatus including a rotary cylinder block having radial cylinder chambers, piston structures for said chambers, and an eccentric reaction ring; said reaction ring having a conical surface against which the outer ends of the piston structures bear; said cylinder chambers having ports opening in one of the side surfaces of the block: a non-rotary valve plate having a low pressure port and a high pressure port respectively on opposite sides of a plane passing through the axis of rotation of the block as well as the axis of the reaction ring; the plate ports opening in a surface of the plate which cooperates with the one of said side surfaces of the block; said plate having an opposite surface; means providing a bearing support for the block, and having a center of load reaction axially spaced from the plane of the axes of the cylinder chambers; said load reaction setting up a first torque that urges the block angularly about an axis transverse to the axis of rotation; the reaction of the piston structures against the conical surface of the reaction rings setting up a second torque that urges the block angularly about said transverse axis; and fluid pressure means cooperating with opposite sides of said valve plate to produce a third torque in a direction to reduce the effect of said first and second torques.

2. In hydrodynamic apparatus including a rotary cylinder block having radial cylinder chambers, piston structures for said chambers, and an eccentric reaction ring; said reaction ring having a conical surface against which the outer ends of the piston structures bear; said cylinder chambers having ports opening in one of the side surfaces of the block: a non-rotary valve plate having a low pressure port and a high pressure port respectively on opposite sides of a plane passing through the axis of rotation of the block as well as the axis of the reaction ring; the plate ports opening in a surface of the plate which cooperates with the one of said side surfaces of the block; said plate having an opposite surface; the reaction of the piston structures against the conical surface of the reaction ring setting up a first torque that urges the block angularly about an axis transverse to the axis of rotation; and fluid pressure means cooperating with opposite sides of said valve plate to produce a torque upon the cylinder block in a direction to reduce the effect of said first torque.

3. In hydrodynamic apparatus including a rotary cylinder block having radial cylinder chambers, piston structures for said chambers, and an eccentric reaction ring; said cylinder chambers having ports opening in one of the side surfaces of the block: a non-rotary valve plate having a low pressure port and a high pressure port respectively on opposite sides of a plane passing through the axis of rotation of the block as well as the axis of the reaction ring; the plate ports opening in a surface of the plate which cooperates with the one of said side surfaces of the block; said plate having an opposite surface; and means carried by the cylinder block and forming a channel for accommodating an edge of the valve plate, opposite walls of the channel facing opposite sides of the valve plate; there being fluid passages connected to the high pressure port of the valve plate, and to the said opposite sides.

4. In hydrodynamic apparatus including a rotary cylinder block having radial cylinder chambers, piston structures for said chambers, and an eccentric reaction ring; said cylinder chambers having ports opening in one of the side surfaces of the block: a non-rotary valve plate having a low pressure port and a high pressure port respectively on opposite sides of a plane passing through the axis of rotation of the block as well as the axis of the reaction ring; the plate ports opening in a surface of the plate which cooperates with the one of said side surfaces of the block; said eccentric ring being adjustable in a direction transverse to the axis of rotation of the cylinder block; a pair of fluid pressure operated adjusting pistons at substantially diametrically opposite points of said ring for exerting opposed adjusting forces; and means responsive to a variation in the high pressure side of the device for causing one of the adjusting pistons to overpower the other.

5. In hydrodynamic apparatus including a rotary cylinder block having radial cylinder chambers, piston structures for said chambers, and an eccentric reaction ring; said cylinder chambers having ports opening in one of the side surfaces of the block: a non-rotary valve plate having a low pressure port and a high pressure port respectively on opposite sides of a plane passing through the axis of rotation of the block as well as the axis of the reaction ring; the plate ports opening in a surface of the plate which cooperates with the one of said side surfaces of the block; said eccentric ring being adjustable in a direction transverse to the axis of rotation of the cylinder block; a pair of adjusting pistons at substantially diametrically opposite points of said ring for exerting opposed adjusting hydraulic forces; a valve for controlling the flow of high pressure fluid to that one of said pistons that tends to reduce the eccentricity; and means responsive to an increase in the pressure at the high pressure side for opening the valve.

6. In hydrodynamic apparatus including a rotary cylinder block having radial cylinder chambers, piston structures for said chambers, and an eccentric reaction ring; said cylinder chambers having ports opening in one of the side surfaces of the block; a non-rotary valve plate having a low pressure port and a high pressure port respectively on opposite sides of a plane passing through the axis of rotation of the block as well as the axis of the reaction ring; the plate ports opening in a surface of the plate which cooperates with the one of said side surfaces of the block; said plate having an opposite surface; the compression in said cylinder chambers imposing torque on said cylinder block about an axis transverse to the axis of rotation of said cylinder block; means interengaged with said cylinder block and having a reaction surface in opposed relation with said opposite surface of said plate, and said reaction surface being located on both sides of said plane; means for providing fluid communication from said high pressure port to said opposite surface of said plate for effecting between the last mentioned surface and said reaction surface a separating force, proportional to the pressure in said high pressure port, and substantially equally effective on both sides of said plane through the block and ring axes, for urging said one surface of said cylinder block and said cooperating surface of the plate toward each other; means for providing fluid communication from said high pressure port to an area between the last mentioned surfaces of the plate and cylinder block, on the high pressure side of said plane through the block and ring axes; and the last-mentioned means including means responsive to fluid pressure for effecting between said last-mentioned surfaces a separating force proportional to the pressure in said high pressure port; the resultant torque upon said cylinder block from said forces being substantially equal to and counteracting the first-mentioned torque imposed on said cylinder block.

7. In hydrodynamic apparatus as set forth in claim 6, means providing a sole bearing support for the block, and having a center of load reaction axially spaced from the plane of the axes of the cylinder chambers and on the far side of said cylinder axes plane from said one surface of said block.

8. In hydrodynamic apparatus including a housing, a rotary cylinder block mounted for rotation in said housing and having radial cylinder chambers and a port face, the chambers having ports opening in said port face, pistons in said chambers, and reaction ring means eccentric to the axis of rotation of said block, and encircling said block and engaging said pistons: a valve plate fixed to said housing and having opposite faces, the first of said valve plate faces being presented toward and in opposed relation to said port face of the block, and the second of said valve plate faces being presented away from said port face of the block; said valve plate also having a low pressure port and a high pressure port opening in said one of its faces and located on opposite sides, respectively, of a plane passing through the axis of rotation of said block structure and the axis of said reaction ring means; means located on the far side of said block from its said port face and providing the sole annular bearing support for said block, said bearing structure having a center of load reaction located on said far side of the block and axially spaced from said cylinder chambers; said load reaction, and the reaction of said piston structures against said reaction ring means, imposing torque on said block directed transversely to the axis of rotation of the block; said port face of the block and said first face of the valve plate having oppositely disposed reaction surfaces; fluid communication means for subjecting the last-mentioned surfaces, on the high pressure side of said plane, to fluid pressure from said high pressure port; reaction means carried by said block and in opposed relation to the second face of the valve plate; said second valve plate face, and said reaction means carried by said block, having oppositely disposed reaction surfaces on both sides of said plane; fluid communication means for subjecting the last-mentioned surfaces, substantially equally on both sides of said plane, to fluid pressure from said high pressure port; all of said oppositely disposed reaction surfaces being so proportioned with respect to said fluid pressure as to impose torque on said block directed oppositely to said first-mentioned torque and substantially balancing the same.

References Cited in the file of this patent
UNITED STATES PATENTS

| | | |
|---|---|---|
| 2,406,138 | Ferris | Aug. 20, 1946 |
| 2,506,974 | Sorensen | May 9, 1950 |
| 2,509,256 | Sorensen | May 30, 1950 |
| 2,608,933 | Ferris | Sept. 2, 1952 |
| 2,646,754 | Overbeke | July 28, 1953 |